(12) United States Patent
Lehmann

(10) Patent No.: US 9,038,257 B2
(45) Date of Patent: May 26, 2015

(54) HIGH-SPEED LOADING/UNLOADING OF OBJECTS

(71) Applicant: Martin Lehmann, Wohlen (CH)

(72) Inventor: Martin Lehmann, Wohlen (CH)

( * ) Notice: Subject to any disclaimer, the term of this patent is extended or adjusted under 35 U.S.C. 154(b) by 191 days.

(21) Appl. No.: 13/665,042

(22) Filed: Oct. 31, 2012

(65) Prior Publication Data

US 2014/0115856 A1    May 1, 2014

(51) Int. Cl.
*B65G 17/30* (2006.01)
*G01M 3/32* (2006.01)

(52) U.S. Cl.
CPC .............. *B65G 17/30* (2013.01); *G01M 3/329* (2013.01)

(58) Field of Classification Search
CPC ..... B65G 17/126; B65G 17/30; G01M 3/329; G01M 3/00; G01N 2035/0465; B23Q 7/1463; B23Q 7/1478
USPC ............... 29/430, 407.01; 198/617, 703, 705; 73/45.1
See application file for complete search history.

(56) References Cited

U.S. PATENT DOCUMENTS

| | | | |
|---|---|---|---|
| 5,907,093 A | 5/1999 | Lehmann | |
| 6,082,184 A | 7/2000 | Lehmann | |
| 6,185,987 B1 | 2/2001 | Lehmann | |
| 6,202,477 B1 | 3/2001 | Lehmann | |
| 6,305,215 B2 | 10/2001 | Lehmann | |
| 6,439,033 B1 | 8/2002 | Lehmann | |
| 6,446,493 B1 | 9/2002 | Lehmann | |
| 6,575,016 B2 | 6/2003 | Lehmann | |
| 6,829,936 B2 | 12/2004 | Lehmann | |
| 7,000,456 B2 | 2/2006 | Lehmann | |
| 8,753,106 B2 * | 6/2014 | Lee et al. | .................... 425/403.1 |

FOREIGN PATENT DOCUMENTS

WO    WO 2011/012730 A2    2/2011

OTHER PUBLICATIONS

Wilco AG; Leak Detection and Inspection Machines—Experience and innovation since 1971; 2 pages, early-mid 2012.

* cited by examiner

Primary Examiner — John C Hong
(74) Attorney, Agent, or Firm — Oliff PLC

(57) ABSTRACT

The present invention relates to methods and an apparatuses for loading and unloading objects into/from corresponding cavities in holders at a high count rate. For loading, a plurality of objects are present on an object path which mutually converges with a holder path. For unloading, the object path mutually diverges from the holder path. Integration of this method and apparatus respectively into a method of manufacturing unleaky containers and a corresponding apparatus for leak testing containers is also proposed.

29 Claims, 12 Drawing Sheets

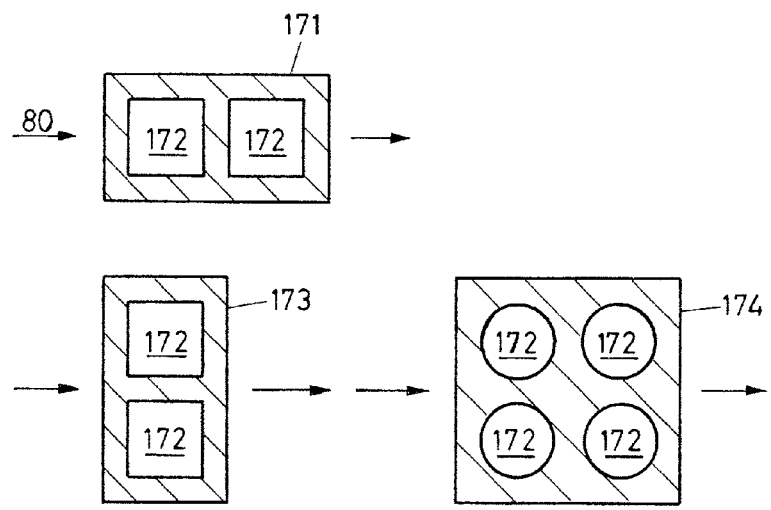
FIG.17
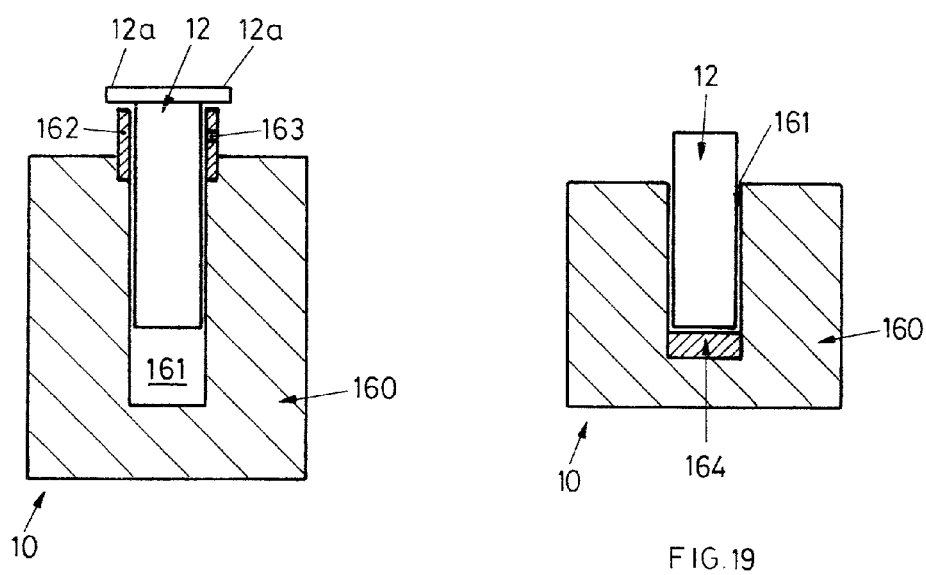
FIG.18
FIG.19

HIGH-SPEED LOADING/UNLOADING OF OBJECTS

BACKGROUND OF THE INVENTION

In many production line situations, such as in manufacturing or testing situations, it is required to load objects such as containers into cavities in holders therefor, and subsequently to unload them from the holders. In comparison to merely transferring such objects from one conveyor to another, this loading in particular requires relatively precise positioning of the object such that it is deposited accurately into its cavity in its respective holder. This is all the more important when the object is fragile, such as e.g. in the case of glass syringes, since they must be handled and deposited gently to avoid breakage. Such holders are used as caddies to transport the objects through at least part of the manufacturing and/or testing system, and are commonly known in the field of leak testing as "pucks". It should be noted that these holders thus do not form part of the consumer product being manufactured or tested, rather are used to assist in the holding and transport of the objects through at least part of the manufacturing or testing system, the objects themselves constituting at least part of the end product.

Typically, this is achieved by using a robot to transfer the objects into the holders by collecting each object from a conveyor individually and depositing it as gently as required in its respective holder, before returning to collect another object and repeat the process. Unloading the objects from the holders is performed in the reverse sequence. Modern robots are fast enough to perform these tasks even when the container holders are provided in a continuously-moving stream. However these processes are still relatively slow, and depending on the geometry of the loading arrangement, are limited to loading and unloading about 60 objects per minute. Furthermore, the movement of the robot is typically jerky, exhibiting high accelerations, which risks damaging the objects if they are fragile.

FIG. 1 illustrates schematically such a prior art robot-based apparatus for loading objects into holders. Holders 10 provided with cavities 17 are conveyed sequentially in a stream on a conveyor mechanism 11, which may be of any known type such as linear, curved, or rotary. Objects 12, which may be of any type or shape, are conveyed along an object input conveyor 13, from which they are collected one-by-one by grippers 16 of a robot arm 14 of a robot 15. These grippers 16 may be of any known type such as pincers, hooks, one or more suckers, or similar. The robot arm 14 is movable both parallel and perpendicular to the plane of conveyor mechanism 11, so as to deposit objects 12 into respective cavities 17. After depositing an object 12 in the cavity of a holder 10, the robot returns to collect another object 12 from the object input conveyor 13, and the process repeats. If the holders 10 are moving continuously, the robot arm 14 follows this movement in synchronicity therewith, and the grippers 16 release the objects 12 either when they have reached their final insertion depth in the holders 10, or just before such that the object 12 falls a short distance into its resting place in its respective holder 10.

Unloading objects 12 from container holders 10 is carried out by an essentially mirror-image apparatus with the same components but operated in reverse. In the interests of conciseness, such a prior art arrangement need not be described further.

When utilising such a robot-based system, the only way to increase the throughput is, besides accelerating operation of the one robot, to use multiple robots, which is expensive and entails high maintenance costs and increased risk of parts breakage.

An object of the invention is thus to overcome the above-mentioned disadvantages of the prior art and thereby to provide apparatuses and methods for loading and unloading objects from cavities in holders at a significantly greater rate than possible with prior art methods and apparatuses, thereby minimising acceleration forces exerted upon the objects.

The invention also concerns the application of these methods and apparatuses to a method of manufacturing closed, unleaky containers, and an apparatus for leak testing containers respectively.

SUMMARY OF THE INVENTION

An object of the invention is attained by a method of loading objects into cavities of holders. Holders are conveyed along a holder path, and each holder comprises at least one cavity for receiving an object to be loaded into the cavity in a loading-direction. This loading direction would in practice normally be perpendicular to the direction of travel of the holders, however this does not have to be the case.

In the field of leak testing, these "holders" are commonly referred to as "pucks".

Objects are transported along an object path extending to a loading area. The object path and the holder path are configured to mutually converge in a direction parallel to the loading-direction as distance along the object path to the loading area decreases. In other words the object path and the holder path converge approaching the loading area. In the loading area, and object is loaded into a cavity. Importantly, a plurality of objects are transported simultaneously at different positions along the object path, and likewise a plurality of holders are conveyed simultaneously at different positions along the holder path. In consequence, at any given time a plurality of objects are at different stages of being transported so as to be loaded into corresponding cavities in corresponding holders, both along the loading path and on the loading direction. This thus permits significantly faster rates of loading than the above-mentioned prior art robot-based system, in which only a single object is in the process of being loaded into a cavity at any given time. In addition, the loading is in consequence smooth and continuous.

In one embodiment of the above-mentioned methods, the object path is configured to approach the holder path and in another embodiment, the holder path is configured to approach the object path. These two possibilities naturally also include the possibility of both the holder path approaching the object path while the object path approaches the holder path.

In an embodiment of any of the above-mentioned methods, the method further comprises first collecting objects sequentially from a collecting area upstream of the loading area, providing a flow of objects onto the object path.

In an embodiment of any of the above-mentioned methods, either the object path, the holder path, or both are linear, curved, rotary, or any combination thereof. This provides flexibility in design of the shape of the paths considered in the loading direction.

In an embodiment of any of the above-mentioned methods, in which the object path is at least in the loading area above the object path, the objects are dropped a non-vanishing specified distance (measured from their respective cavities and considered parallel to the loading direction) into their respective cavities. This prevents object supports from "bottoming out" and risking pushing the objects too firmly into the cavities, possibly resulting in damage and/or wear to the mechanism. The objects are thus released while they are still above their ending position and fall the last short distance into their respective cavities. In a further embodiment thereof, the objects are dropped onto a shock-absorbing member, reducing the risk of damage to the objects in the case that they are fragile and/or frangible. This shock-absorbing member can be made of any convenient shock-absorbing material, such as rubber, nylon, or similar.

In an embodiment of any of the above-mentioned methods, at least part of the holders comprise a plurality of cavities, and a plurality of objects are deposited into this plurality of cavities, either simultaneously as a batch or sequentially. This enables increasing the throughput rate of objects even further due to being able to load more objects into a single holder.

In an embodiment of any of the above-mentioned methods, the transporting and/or the conveying is carried out continuously, that is to say that the objects are loaded in a continuous stream in quick succession, giving a high throughput rate without a high acceleration of the objects.

In an embodiment of any of the above-mentioned methods, the transporting and conveying are carried out synchronously with each other. This results in a simple method, since both the transporting and conveying are fully synchronous with each other, no complicated arrangements are required to ensure that an object and its corresponding holder pass through the loading area at exactly the right velocities, since this is then inherent in the synchronicity.

In an embodiment of any of the above-mentioned methods, respective objects along the object path travel in the loading area at a velocity in a plane perpendicular to the loading direction substantially equal to the velocity of the respective holders on the holder path in the loading area, thus ensuring that the respective velocities are optimal for easy and safe insertion.

In an embodiment of any of the above-mentioned methods, the position of the objects on the object path in a direction parallel to the loading direction is controlled by at least one of: a cam arrangement, pneumatically, by electric motors, hydraulically. This results in simple and reliable control of the position of the objects.

In an embodiment of any of the above-mentioned methods, the position of the holders on the holder path in a direction parallel to the loading direction is controlled by at least one of: a cam arrangement, pneumatically, by electric motors, hydraulically. This results in simple and reliable control of the position of the holders.

An object of the invention is likewise attained by a method of unloading objects from cavities of holders. Holders are conveyed along a holder path, each holder comprising at least one cavity and each cavity having an unloading-direction. At least some of the cavities comprise an object loaded in the cavity. The objects are picked up sequentially from the holders in a pickup area, and are transported along an object path extending from the pickup area. This object path and the holder path are configured to mutually diverge in a direction parallel to said unloading-direction as distance along the object path from the pickup area increases, i.e. the object path and the holder path diverge as they move away from the pickup area. As above, a plurality of objects are transported simultaneously at different positions along the object path, and likewise a plurality of holders are conveyed simultaneously at different positions along the holder path. In consequence, at any given time a plurality of objects are at different stages of being transported so as to be unloaded from corresponding cavities in corresponding holders. This thus permits significantly faster rates of unloading than the above-mentioned prior art robot-based system, in which only a single object is in the process of being unloaded into a cavity at any given time. In addition, the unloading is in consequence smooth and continuous.

In an embodiment of the above-mentioned unloading method, the object path is configured to withdraw from the holder path in a direction parallel to the unloading direction as distance along the object path from the pickup area increases, and in another embodiment the holder path is configured to withdraw likewise from the object path. Furthermore, these two embodiments can naturally be combined so such that both the holder path and the object path simultaneously withdraw from each other.

In an embodiment of any of the above-mentioned unloading methods, the objects are subsequently deposited in a deposition area downstream of the pickup area, thereby removing the objects from the object path.

In an embodiment of any of the above-mentioned unloading methods, either the object path, the holder path, or both are linear, curved, rotary, or any combination thereof. This provides flexibility in design of the shape of the paths considered in the unloading direction.

In an embodiment of any of the above-mentioned unloading methods, at least part of the holders each comprise a plurality of cavities, and a plurality of objects are picked up from this plurality of cavities, either simultaneously as a batch or sequentially. This enables increasing the throughput rate of objects even further due to being able to hold more objects in a single holder and unload them therefrom.

In an embodiment of any of the above-mentioned unloading methods, the transporting and/or the conveying is carried out continuously, that is to say that the objects are unloaded in a continuous stream in quick succession, giving a high throughput rate.

In an embodiment of any of the above-mentioned unloading methods, the transporting and conveying are carried out synchronously with each other. This results in a simple method, since both the transporting and conveying are fully synchronous with each other.

In an embodiment of any of the above-mentioned unloading methods, respective objects along the object path travel in the pickup area at a velocity in a plane perpendicular to the loading direction substantially equal to the velocity of the respective holders, holder path in the pickup area, thus ensuring that the respective velocities are optimal for easy and safe extraction of the objects from the cavities.

In an embodiment of any of the above-mentioned unloading methods, the position of the objects on the object path in a direction parallel to the unloading direction is controlled by at least one of: a cam arrangement, pneumatically, by electric motors, hydraulically. This results in simple and reliable control of the position of the objects.

In an embodiment of any of the above-mentioned unloading methods, the position of the holders on the holder path in a direction parallel to the unloading direction is controlled by at least one of: a cam arrangement, pneumatically, by electric motors, hydraulically. This results in simple and reliable control of the position of the holders.

An object of the present invention is likewise attained by an apparatus for loading objects into cavities in holders. This apparatus comprises at least one holder conveyor defining a holder path for conveying holders to, through, and from the loading area. Each holder has at least one cavity, and each cavity has a loading direction, in which an object can be loaded. A transport arrangement is provided for transporting objects into cavities in the holders on the at least one holder conveyor in the loading-direction in the loading area. This transport arrangement comprises a plurality of movable releasable object supports. The position of the plurality of object supports defines an object path: when stationary, a curve passing through the plurality of object supports would define the object path, which likewise corresponds to the path taken by the object supports when the apparatus is in operation. This object path and the holder conveyor are configured to mutually approach in a direction parallel to the loading-direction as distance to the loading area decreases, i.e. the object path and the holder conveyor converge in the direction of the loading area. This enables a plurality of objects to be transported simultaneously at different positions along the object path, considered both parallel and perpendicular to the loading direction, and likewise enables a plurality of holders to be conveyed simultaneously at different positions along the holder path. In consequence, at any given time when the apparatus is in operation, a plurality of objects will be at different stages of being transported so as to be loaded into corresponding cavities in corresponding holders. This thus permits significantly faster rates of loading than the above-mentioned prior art robot-based apparatus, in which only a single object can be in the process of being loaded into a cavity at any given time. In addition, the loading is in consequence smooth and continuous, and the apparatus is only subjected to minimal accelerations which significantly increases the maintenance interval of the apparatus.

In an embodiment of the above-mentioned loading apparatus, the object supports are movable at least parallel and perpendicular to the loading-direction, and the object path approaches the at least one holder conveyor at decreasing distance to the loading area, and in another embodiment, the object supports are movable at least perpendicular to the loading direction, and the conveyor is configured to approach the at least one object path in a direction parallel to the loading-direction at decreasing distance to the loading area. These embodiments can naturally be combined such that both the object path and the holder conveyor mutually converge.

In an embodiment of any of the above-mentioned loading apparatuses, the apparatus further comprises at least one object input for objects which defines a collecting area, this collecting area being situated upstream of the loading area and from which the transport arrangement can collect objects.

In an embodiment of any of the above-mentioned loading apparatuses, the holder conveyor and/or the transport arrangement is/are linear, curved, rotary, or any combination thereof. This provides flexibility in design of the shape of the paths considered in the loading direction.

In an embodiment of any of the above-mentioned loading apparatuses, each holder comprises a shock-absorbing member of a soft material such as nylon, silicon rubber, or natural rubber. This shock-absorbing member reduces the risk of damage to the objects in the case that they are fragile and/or frangible. This shock-absorbing member can be situated at the open end of the cavity, forming an extension thereof, and is arranged to interact with an abutment, such as a flange, of the object. This results in the flange of the object contacting the shock-absorbing member, suspending the object from its flange.

In an embodiment of any of the above-mentioned loading apparatuses, each holder is provided with a plurality of cavities, and the transport arrangement is arranged to deposit objects sequentially or simultaneously as a batch into each of the plurality of cavities in the respective holder. This enables a "multiple puck" configuration for improving object throughput rate.

In an embodiment of any of the above-mentioned loading apparatuses not contradicting herewith, the position of the object supports is controlled at least partially by at least one of: a cam arrangement, hydraulically, by electric motors, pneumatically. This enables simple and accurate control of the position of the object supports.

In an embodiment of any of the above-mentioned loading apparatuses not contradicting herewith, the position of the holders is at least partially defined by at least one of: a cam arrangement, hydraulically, electric motors, pneumatically. This enables simple and accurate control of the position of the holders.

In an embodiment of any of the above-mentioned loading apparatuses, the releasable object supports comprise suction cups or grippers opening parallel or perpendicular to the insertion direction, enabling reliable gripping of the objects.

In an embodiment of any of the above-mentioned loading apparatuses, the transport arrangement is arranged to transport respective objects opposite their respective holders synchronously therewith, which provides a simple arrangement for ensuring correct timing and alignment of the objects and their respective holders.

In an embodiment of any of the above-mentioned loading apparatuses not in contradiction herewith, each holder comprises more than one cavity, the transport arrangement being arranged to collect a corresponding quantity of objects from the object input and then deposit these objects in each of the plurality of cavities in the respective holder. This permits increased throughput of objects in the loading apparatus.

An object of the invention is likewise attained by an apparatus for unloading objects from cavities in holders. This apparatus comprises at least for conveying holders to, through, and from a pickup area, each cavity having an unloading direction. A transport arrangement is provided for transporting objects from the pickup area, comprising a plurality of movable releasable object supports. The positions of these object supports define an object path for transporting objects from the cavities in the holders on the holder conveyor, and this transport path and the holder conveyor are configured to mutually diverge in a direction parallel to the unloading direction as distance from the pickup area increases. This enables a plurality of objects to be transported simultaneously at different positions along the object path, and likewise a plurality of holders to be conveyed simultaneously at different positions along the holder path. In consequence, at any given time when the apparatus is in operation, a plurality of objects will be at different stages of being transported so as to be unloaded from the corresponding cavities in corresponding holders. This thus permits significantly faster rates of unloading than the above-mentioned prior art robot-based apparatus, in which only a single object can be in the process of being unloaded from a cavity at any given time. In addition, the unloading is in consequence smooth and continuous, avoiding large accelerations, hence stress on the apparatus is reduced.

In an embodiment of the above-mentioned unloading apparatus, the object supports are movable at least parallel and perpendicular to the unloading-direction, and the object path withdraws from the at least one holder conveyor at increasing distance from the pickup area, and in another embodiment, the object supports are movable at least perpendicular to the unloading direction, and the conveyor is configured to withdraw from the at least one object path in a direction parallel to the unloading-direction at increasing distance from the pickup area. These embodiments can naturally be combined such that both the object path and the holder conveyor mutually diverge.

In an embodiment of any of the above-mentioned unloading apparatuses, the apparatus further comprises an object output defining a deposition area downstream of the pickup area, which provides a location for the unloaded objects to be output from the apparatus.

In an embodiment of any of the above-mentioned unloading apparatuses, the holder conveyor and/or the transport arrangement is/are at least one of linear, curved, and rotary. This provides flexibility in design of the shape of the parts.

In an embodiment of any of the above-mentioned unloading apparatuses, each holder is provided with more than one cavity, the transport arrangement being arranged to pick up objects from each of the plurality of cavities in a respective holder. This permits increased throughput of objects.

In an embodiment of any of the above-mentioned unloading apparatuses, each holder comprises a shock-absorbing member of a soft material such as nylon, silicon rubber, or natural rubber. This shock-absorbing member reduces the risk of damage to the objects in the case that they are fragile and/or frangible. This shock-absorbing member can be situated at the open end of the cavity, forming an extension thereof, and is arranged to interact with an abutment, such as a flange, of the object. This results in the flange of the object contacting the shock-absorbing member, suspending the object from its flange.

In an embodiment of any of the above-mentioned unloading apparatuses, the shape of the transport path is at least partially defined by at least one of: a cam arrangement, hydraulically, by electric motors, pneumatically. This enables simple and accurate control of the position of the objects.

In an embodiment of any of the above-mentioned unloading apparatuses, the shape of the conveying path is at least partially defined by at least one of: a cam arrangement, hydraulically, by electric motors, pneumatically. This likewise enables simple and accurate control of the position of the holders.

In an embodiment of any of the above-mentioned unloading apparatuses, the releasable object supports comprise suction cups or grippers opening parallel or perpendicular to the insertion direction, enabling reliable gripping of the objects.

In an embodiment of any of the above-mentioned unloading apparatuses, the transport arrangement is arranged to transport respective objects opposite respective holders synchronously therewith, which provides a simple arrangement for ensuring correct timing and alignment of the objects and their respective holders.

The invention further relates to a method of manufacturing closed, unleaky containers comprising first manufacturing closed, untested, containers. These untested containers are then loaded into holders by any of the above mentioned methods of loading objects into cavities in holders, the containers constituting the objects. Subsequently, these containers are leak tested in a leak detection step which may be of any known type. Containers determined as leaking are then rejected together with their corresponding holder. Non-rejected containers are then unloaded from their respective holders by any of the above-mentioned methods of unloading objects from holders, and these non-rejected containers are then accepted as being unleaky containers.

An alternate method of manufacturing closed unleaky containers comprises first manufacturing closed, untested, containers. These untested containers are then loaded into holders by any of the above mentioned methods of loading objects into cavities in holders, the containers constituting the objects. Subsequently, these containers are leak tested in a leak detection step which may be of any known type. The containers are then unloaded from the holders by any of the above-mentioned methods of unloading objects from holders, after which containers determined as leaking in the leak detection step are rejected, and containers not rejected in the previous step are accepted as unleaky containers.

The invention further relates to an apparatus for leak testing containers comprising an apparatus for loading objects into cavities in holders according to any of the above embodiments thereof, a leak testing apparatus of any known type downstream of the loading apparatus, and an apparatus for unloading objects holders according to any of the above-mentioned embodiments thereof, situated downstream of the leak testing apparatus. A rejection mechanism for rejecting containers determined as leaking by the leak testing apparatus is operated based on an output of the leak testing apparatus, and is situated either between the leak testing apparatus and the unloading apparatus, or downstream of the unloading apparatus. The container input is provided upstream of the loading apparatus for providing containers as the aforementioned objects to this loading apparatus, and a container output for receiving containers from the unloading apparatus is further provided. Finally, a holder conveyor for conveying the holders to, through, and from each of the loading apparatus, leak detection apparatus, and unloading apparatus sequentially is provided. This apparatus enables high-speed in-line leak testing of containers which has in practice achieved testing rates of up to 600 containers per minute.

In an embodiment of the apparatus for leak testing containers, the holder conveyor is an endless conveyor, i.e. a conveyor arranged as a circuit, ensuring that the holders loop around and are automatically recirculated through the apparatus.

In an embodiment of the apparatus for leak testing containers, the apparatus for loading objects and the apparatus for unloading objects both comprise a rotary holder conveyor and a rotary transport arrangement. This results in a simple, compact arrangement.

BRIEF DESCRIPTION OF DRAWINGS

FIG. 17—schematically, various forms of holder suitable for the apparatus of FIG. 16;

FIG. 18—schematically, a holder suitable for flanged objects;

FIG. 19—schematically, a further variation of a holder;

DETAILED DESCRIPTION OF THE INVENTION

In the figures, like reference signs denote like parts.

Figure 2:
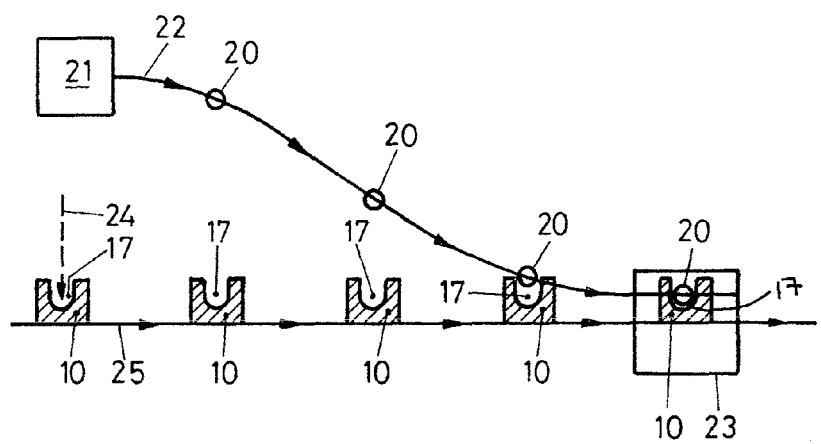
FIG. 2—schematically, the underlying principle of a first aspect of the invention for loading objects into cavities in holders.

FIG. 2 illustrates schematically and most generically a first method for loading objects into holders according to the invention.

Objects 20, which may have been collected sequentially and continuously from a collecting area 21, are transported continuously along an object path 22 extending to loading area 23. Aside from when collecting the first or depositing the last object 20 in any given batch of operation, a plurality of objects 20 will be present on object path 22. Meanwhile, holders 10, each having at least one cavity 17, each cavity being configured to receive an object 20 and having a loading-direction 24, in which an object 20 is insertable into the cavity 17, are conveyed continuously along holder path 25 to, through, and from loading area 23.

Object path 22 approaches the conveyed holders 10, and also approaches holder path 25, as the holder path 25 and object path 22 approach the loading area 23. In loading area 23 the objects 20 are loaded into the holders 10 in loading-direction 24. Self-evidently, objects 20 and holders 10 must pass through loading area 23 at an appropriate rate, i.e. in the case of one cavity 17 in each holder 10, objects 20 must pass through loading area 23 at the same rate as holders 10; in the case of two cavities 17 each holder 10, objects 20 must pass through loading area 23 at double the rate of the holders 10. In addition, at the point of insertion, the movement of the objects 20 and the movement of the holders 10 must be such that insertion of the objects 10 into the cavity 17 can take place without damaging either the objects 20 or the holders 10. This applies equally to all embodiments.

Figure 3:
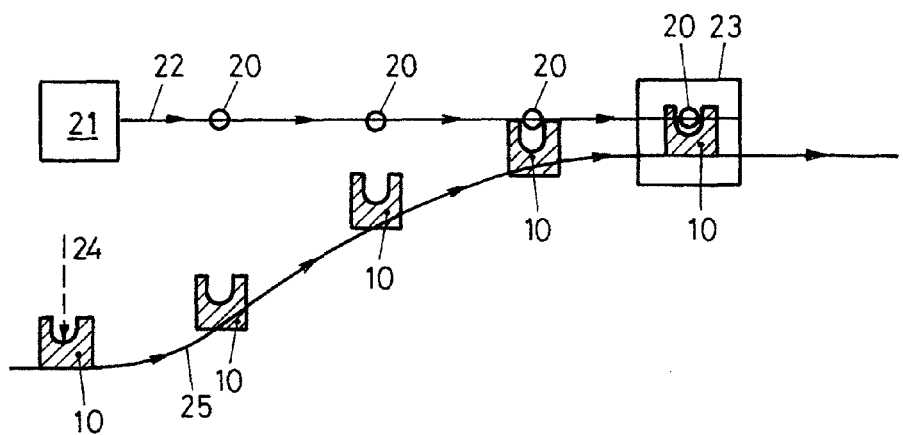
FIG. 3—schematically, the underlying principle of a second aspect of the invention for loading objects into cavities in holders.

FIG. 3 illustrates a variation on the concept of FIG. 2 for loading objects into containers. In contrast to the embodiment illustrated in FIG. 2, in FIG. 3 the objects 20 are transported along the object path substantially on the same level as both the collection area 21 and the loading area 23, and the holder path 25 approaches the transported objects 20 and the object path 22 as the holder path 25 and the object path 22 approach the loading area 23, in which the objects 20 are loaded into the cavity 17 in the holders 10 in the loading-direction 24. By the term "level", we understand position parallel to the (un-)loading direction, i.e. The vertical position as illustrated in the figures.

Figure 1:
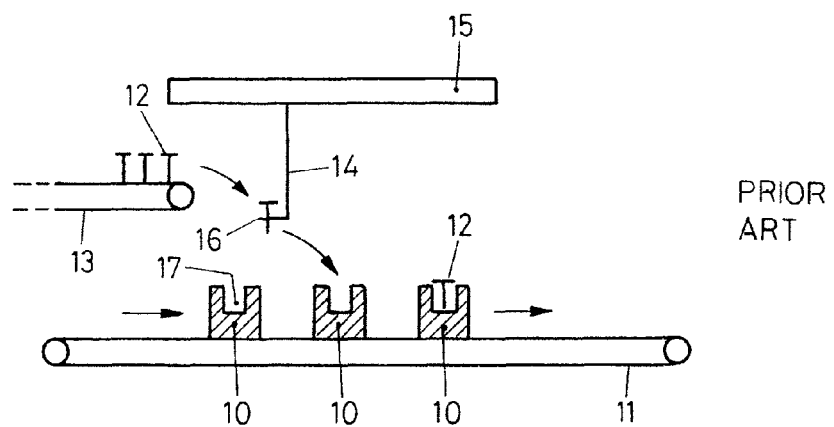
FIG. 1—schematically, a prior art robot-based apparatus for loading objects into cavities in holders.
Figure 4:
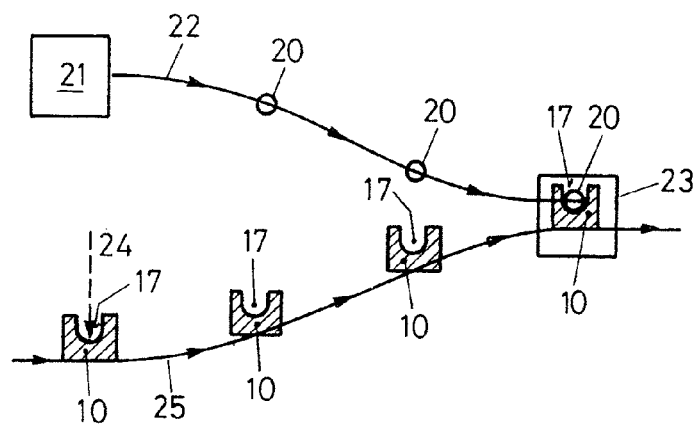
FIG. 4—schematically, the underlying principle of a third aspect of the invention for loading objects into cavities in holders.

FIG. 4 differs from the embodiments of FIGS. 1 and 2 in that the object path 22 and holder path 25 both mutually converge towards loading area 23, which is situated at a different level to both the collecting area 21 and to the holders 10 opposite the beginning of the object path 22.

Figure 5:
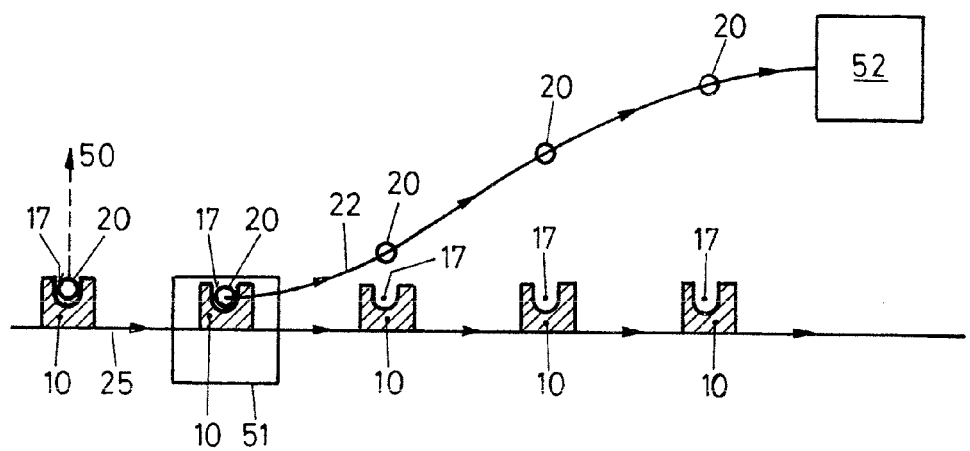
FIG. 5—schematically, the underlying principle of a fourth aspect of the invention for unloading objects from cavities in holders.

FIG. 5 illustrates schematically the principle of the invention when applied to a first variation of unloading objects 20 from holders 10. In analogy to FIGS. 2-4, the cavities 17 of the holders 10 have an unloading-direction 50 in which direction the objects 20 may be removed from the cavities 17 of the holders 10 in unloading direction 50. Holders 10, loaded with objects 20, are conveyed continuously along holder path 25 towards, through, and from pickup area 51, in which objects 20 are picked up and extracted from cavities 17 in unloading direction 50. The picked-up objects are then transported continuously on object path 22, where they may be deposited at deposition area 52. Downstream of pickup area 51, the object path 22 recedes from holder path 25, i.e. moves away from holder path 25 the further it gets from pickup area 51.

Figure 6:
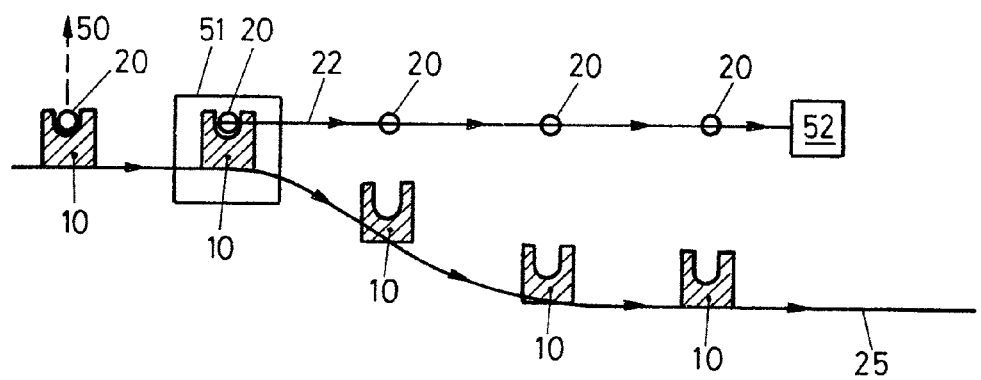
FIG. 6—schematically, the underlying principle of a fifth aspect of the invention for unloading objects from cavities in holders.

FIG. 6, in analogy to FIG. 3, illustrates a variant method for extracting objects 20 from holders 10. Holders 10, loaded with objects 20, are conveyed along holder path 25 to, through, and from pickup area 51, in which objects 20 are picked up. In contrast to the embodiment of FIG. 5, holder path 25 recedes from object path 22 as distance from the pickup area 51 increases, thereby extracting the objects 20 from the holders 10. In this case, deposition area 52 is on the same level as pickup area 51.

Figure 7:
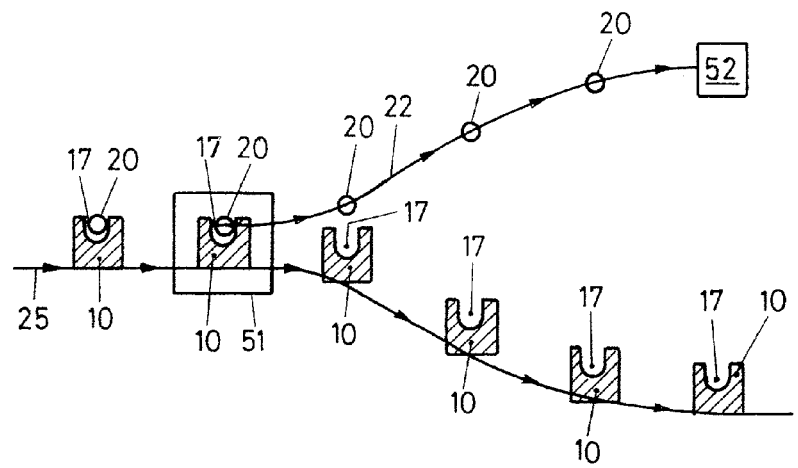
FIG. 7—schematically, the underlying principle of a sixth aspect of the invention for unloading objects from cavities in holders.

FIG. 7, in analogy to FIG. 4, illustrates a variant method for extracting objects 20 from holders 10. In contrast to the embodiments illustrated in FIGS. 5 and 6, both object path 22 and conveyance path 25 diverge from their original levels at pickup area 51, which is at a different level to both deposition area 52 and conveyance path 25 opposite deposition area 52.

In the above discussion of FIGS. 2-7, it should be noted that these figures are purely schematic and the particular shapes of curves, objects, holders, etc are not be construed as limiting. Nor is the fact that the methods have been illustrated linearly limiting: either or both of the holder path and object path may be curved or rotary, or may even have more complex forms as required.

In addition, neither the spacing nor the velocity perpendicular to the insertion direction of the holders 10 or the objects 12 need be the same or similar except within the pickup or deposition area as appropriate.

Figure 8:
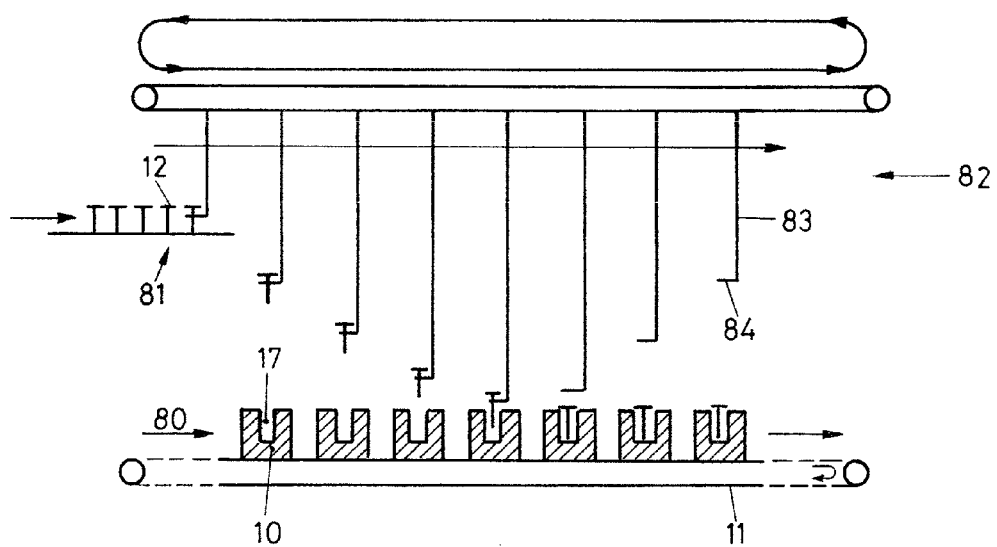
FIG. 8—schematically, an apparatus for loading objects into cavities in holders according to the invention.

FIG. 8 illustrates schematically an embodiment of an apparatus for loading containers 12 into holders 10 according to the invention. Conveyor 11 conveys a continuous stream of holders 10 each provided with a cavity 17 in a direction of conveyance 80 underneath transport arrangement 82. Objects 12 are provided at an object input 81, which may for instance be an object input conveyor of any known type. Transport arrangement 82 is provided with a plurality of movable object supports 83 each provided with releasable grippers 84 which may be of any known type such as pincers, suction cups, hooks, etc. Containers 12 are collected sequentially and continuously at object input 81, and are lowered into cavity 17 in holders 10 continuously. A particularly simple solution involves conveying containers 10 synchronously with the movement of movable object supports 83, i.e. respective holders are conveyed opposite respective object supports at substantially the same velocity perpendicular to the stems of the object supports 83 and to the insertion direction. However, this does not have to be the case: so long as the respective velocities of the objects 12 and the holders 10 at the point of loading the objects 12 into the holders 10 are matched so as to safely load the objects into their respective cavities 17, the respective velocities of the objects 12 and the holders 10 at other points is irrelevant and can be chosen at will.

Once the object 12 has been released by the releasable grippers 84 into its respective cavity 17, object supports 83 are withdrawn from the conveyor 11 and are recirculated so as to collect more objects 12. Upon release, the object 12 may fall a short distance into the cavity 17, which simplifies adjustment of the transport arrangement and reduces the risk of damaging or wearing either the grippers 84 or the containers 12.

The position of object supports 83, i.e. their extension, is controlled by any known means, such as one or more cams, a hydraulic system, electric motors, or a pneumatic system. Such control systems are well-known to the skilled artisan, and thus need not be discussed further. The position of the object supports 83 defines the object path as discussed in context of FIGS. 2-7, and the position of the holders 10 defines the holder path. This equally applies to all foregoing embodiments.

Figure 9:
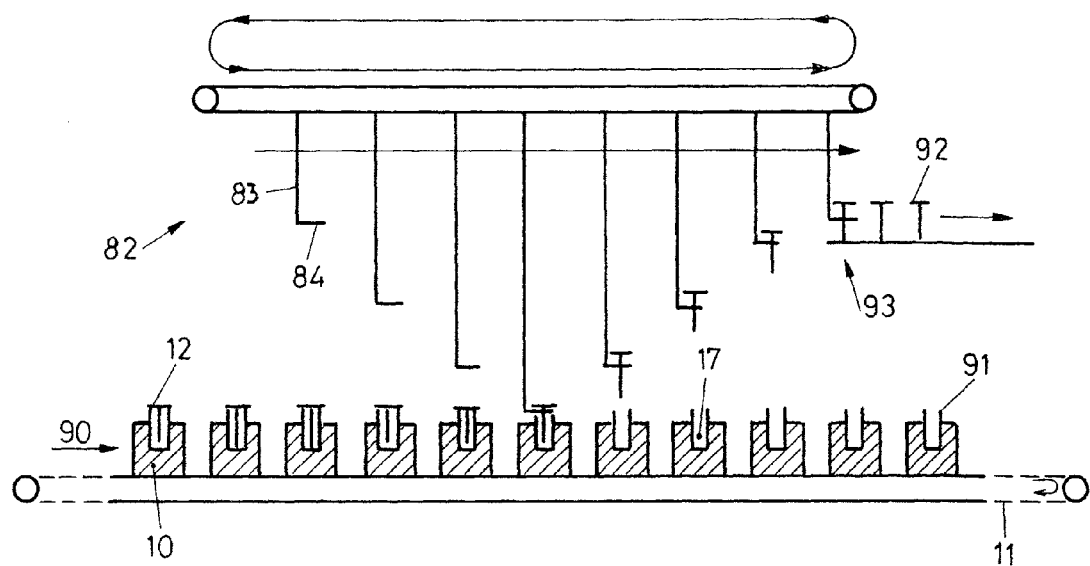
FIG. 9—schematically, an apparatus for unloading objects from cavities in holders according to the invention.

FIG. 9 shows an embodiment of an apparatus for unloading objects 12 from cavities 17 in holders 10 conveyed by conveyor 11. Transport arrangement 82 is similar to that of FIG. 8, except that it is arranged to pick up containers 12 from cavities 17 in holders 10 which are conveyed in a direction 90 beneath transport arrangement 82. In the illustrated embodiment, holders 10 are provided with an extended opening 91 arranged to support abutments or flanges 92 on objects 12. For ease of picking up containers 12 from the holders 10, the diameter of the extended openings 91 is less than that of the flanges or abutments 92, such that grippers 84 can easily hook under flanges or abutments 92 and thereby pick up containers 12. This, however, is purely illustrative, and any arrangement is possible, adapted to the exact shape and size and form of the objects 12 to be picked up. Once picked up, the objects 12 are transferred to object output 93, which may for instance be an object output conveyor, where they are released by grippers 84. Object supports are then recirculated and descend towards the conveyor 11 to pick up more objects 12.

Figure 10:
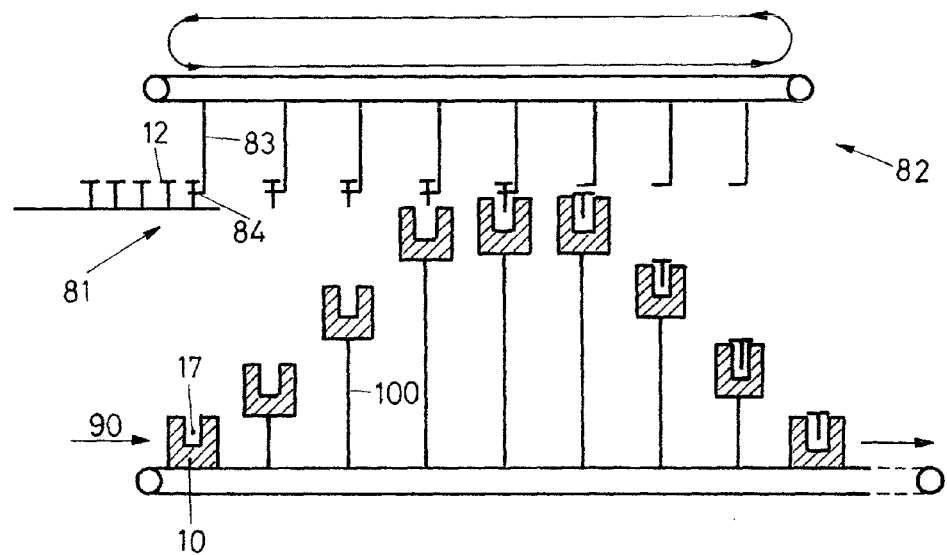
FIG. 10—schematically, a further apparatus for loading objects into cavities in holders according to the invention.

FIG. 10 illustrates a further embodiment of an apparatus for loading objects 12 into cavities 17 in holders 10. In contrast to the embodiment of FIG. 8, the transport arrangement 82 merely collects objects 12 from object input 81. Holders 10 are conveyed by a holder conveyor which comprises a plurality of extendable holder supports 100, which extend to bring the holders 10 up to meet the objects 12. Objects 12 are released into cavities 17 in holders 10 by releasing grippers 84 at an appropriate point, from which the extendable holder supports 100 retract and return the now loaded holders 10 to their original height. Subsequently, the extendable holder supports 100 are recirculated to convey further containers 10. Extendable holder supports 100 are controlled in their extension by cams, pneumatics, hydraulics, or electric motors, as is known to the skilled artisan and need not be discussed further. The position of holder supports 100 defines the holder path as discussed in context with FIG. 2-7 above.

Figure 11:
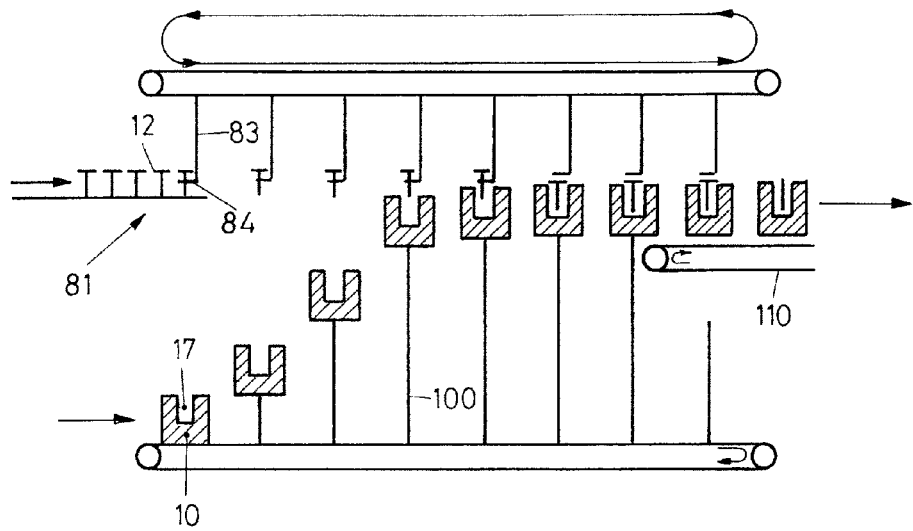
FIG. 11—schematically, a further apparatus for loading objects into cavities in holders according to the invention.

FIG. 11 shows a further embodiment of loading objects 12 into holders 10 which differs from that of FIG. 10 in that the extendable holder supports 100 do not retract with the holders 10 thereupon, rather they deposit loaded holders 10 on a holder output conveyor 110, and retract and are recirculated thereafter.

Figure 12:
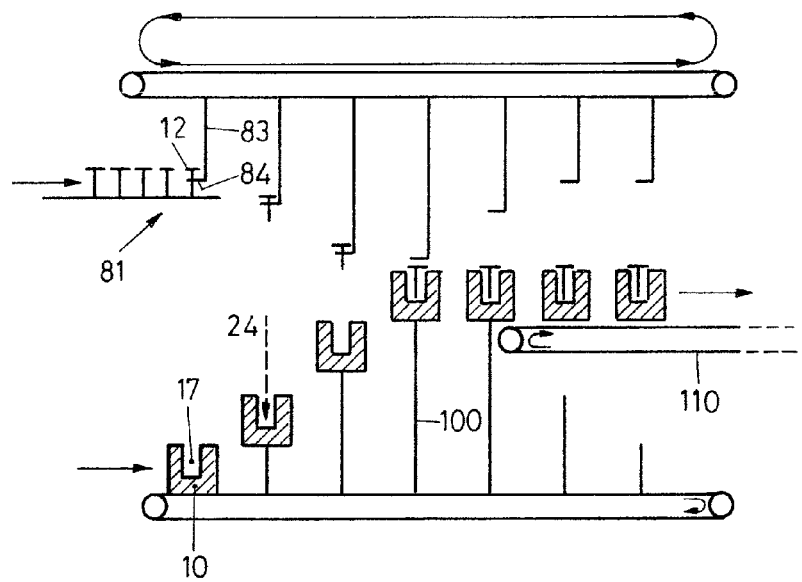
FIG. 12—schematically, a further apparatus for loading objects into cavities in holders according to the invention.

FIG. 12 shows a variant embodiment of loading objects 12 into holders 10, in which both the object holders 83 and the holders 10 are displaced parallel to insertion direction 24, such that insertion of the objects takes place at a level different to both the level of the object input 81 and the starting level of the holders 10. In this embodiment, once the objects 12 have been inserted into the holders 10, the holders are released from extendable holder supports 100 and are deposited on a holder output conveyor. Subsequently, both object supports and extendable holder supports 100 retract and are recirculated.

Figure 13:
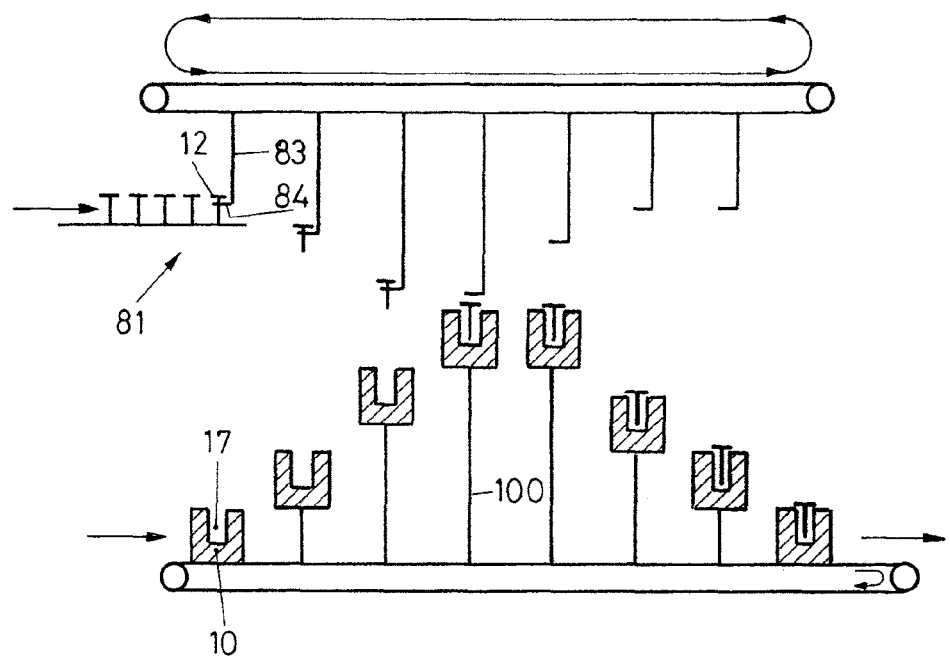
FIG. 13—schematically, a further apparatus for loading objects into cavities in holders according to the invention.

FIG. 13 illustrates a further embodiment for loading objects 12 into holders 10 which differs from that of FIG. 12 in that, after depositing the objects 12 into the holders 10, both the object supports 83 and the extendable holder supports 100 retract, returning the loaded holders 10 to their original level.

Figure 14:
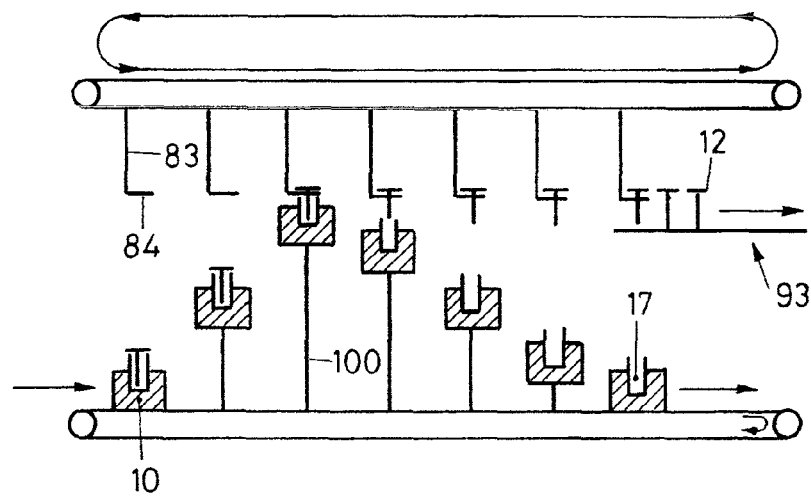
FIG. 14—schematically, a further apparatus for unloading objects from cavities in holders according to the invention.

FIG. 14 illustrates a further embodiment for unloading objects 12 from holders 10, in which object supports 83 are not extendable, and remain at the same level. Extendable holder supports 100 extend towards object supports 83 such that grippers 84 can pick up the objects 12. Subsequently, extendable holder supports 100 and corresponding holders 10 withdraw from object supports 83 and return to their original level. Picked-up objects 12 are deposited at object output 93.

Figure 15:
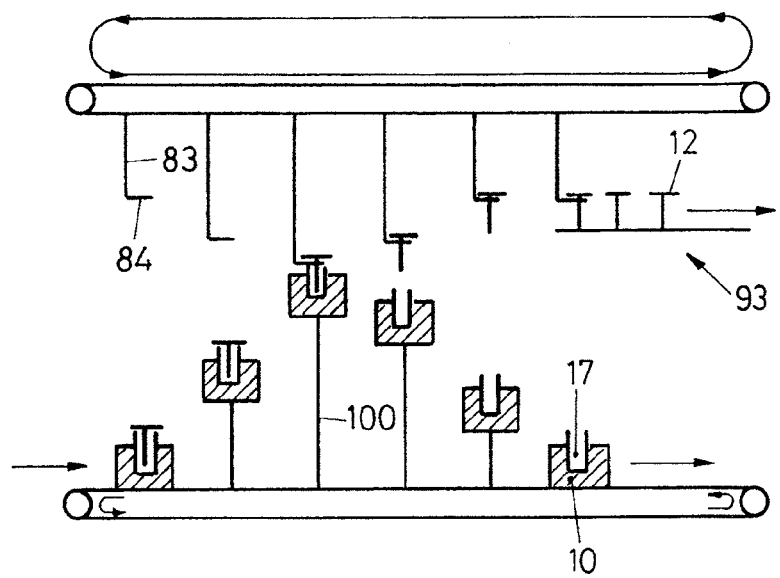
FIG. 15—schematically, a further apparatus for unloading objects from cavities in holders according to the invention.

FIG. 15 illustrates a variant embodiment of FIG. 14 in which object supports 83 are additionally extendable, and extend towards holders 10. After picking up objects 12, both object supports 83 and extendable holder supports 100 and respective holders 10 withdraw to their original levels, and objects 12 are then deposited on object output 93. Other variants are naturally also possible, such as situating the object output 93 at a level different to that of both the starting position of object supports 83 and the starting position of holders 10.

Figure 16:
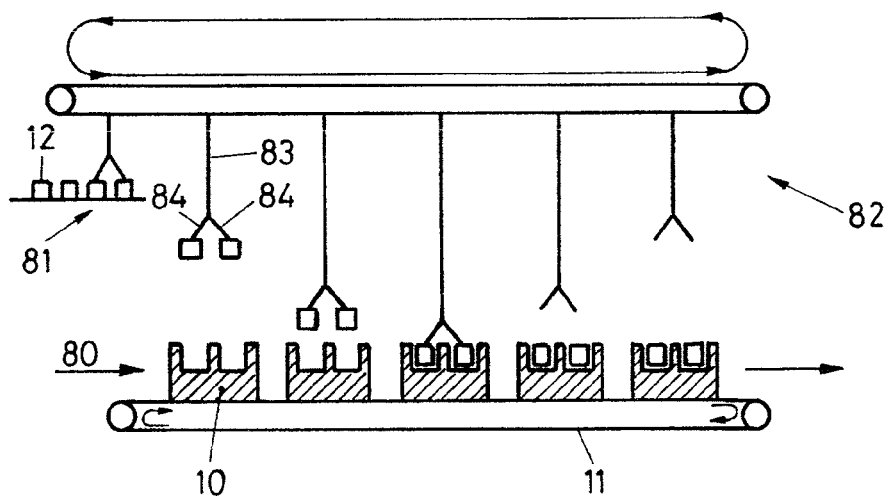
FIG. 16—schematically, a further apparatus for loading objects into cavities in holders according to the invention.

FIG. 16 illustrates schematically an embodiment permitting to further increase throughput of objects 12, illustrated here in analogy to the embodiment of FIG. 8, however the illustrated principle is equally applicable to all loading and unloading apparatuses described in the specification. The apparatus of FIG. 16 differs from the foregoing embodiments in that each holder 10 comprises a plurality of cavities, illustrated in FIG. 16 as to cavities, arranged in the direction of conveyance 80 of the holders 10. Object supports 83 comprises a pair of grippers 84 which simultaneously collect to objects 12 from object input 81 and deposit them simultaneously in their respective holder 10.

FIG. 17 illustrates schematically three variations of holders for use in the embodiment of FIG. 16. Holder 171 comprises two cavities 172 arranged parallel to direction of conveyance 80. Holder 173 comprises two cavities 172 arranged perpendicular to direction of conveyance 80. Holder 174 comprises four cavities arranged in a square. Both holders 173 and 174 will require object input 81 to present objects 12 in two parallel lines such that they can be collected by object supports 83. The exact shape and form of cavities 172 can be arranged as required by the skilled Artisan for the objects in question, and the number and arrangement of cavities can likewise be arranged as required.

FIG. 18 illustrates a specific example of a holder 10 and an object 12. In this figure, object 12 is a container with a flange 12a, such as a filled or unfilled glass syringe. Holder 10 has a body 160 with a cavity 161 formed therein. Cavity 161 is conformed so as to be a loose sliding fit for container 12, and is illustrated in FIG. 18 as being a blind hole, however it could equally be a through hole. The mouth of the cavity is provided with an extension 162, illustrated here as a separate piece made of a soft material such as nylon, silicon rubber, natural rubber, or other sufficiently soft material, against which the flange 12a of container 12 can abut. Thereby, extension 162 acts as a buffer during loading of container 12 into holder 10, reducing the risk of breaking container 12 during insertion. For less fragile objects than glass syringes, extension 162 may be constructed of harder material, or formed integrally with the body 160. To permit a gripper to be able to easily grab container 12, the outer diameter of the extension 162 is less than the diameter of the flange 12a, permitting easy extraction of the container from the holder 10. To permit use of the holder with pressure-based leak-testing systems such as those commercialised by the Applicant, at least one lateral through hole 163 is provided in extension 162 to permit equalisation of the pressure between the cavity 161 and the pressure in a test chamber (not illustrated). Thereby, holder 10 can be used as a so-called "puck" (i.e. a container holder) in such a pressure-based leak detection system as mentioned above, in which the holder 10 may be introduced into a test chamber, or may itself form part of a test chamber.

Naturally, the skilled artisan knows how to configure a holder 10 for a given object 12, and a further example is given in FIG. 19, which shows a holder 10 configured for a fragile cylindrical object 12. Holder 10 has a body 160 provided with a closed-ended cylindrical cavity 161, with buffer 164 of soft material such as nylon, silicon rubber, or natural rubber situated at the closed end of the cavity 161. For less fragile objects, buffer 164 may be eliminated.

Figure 20:
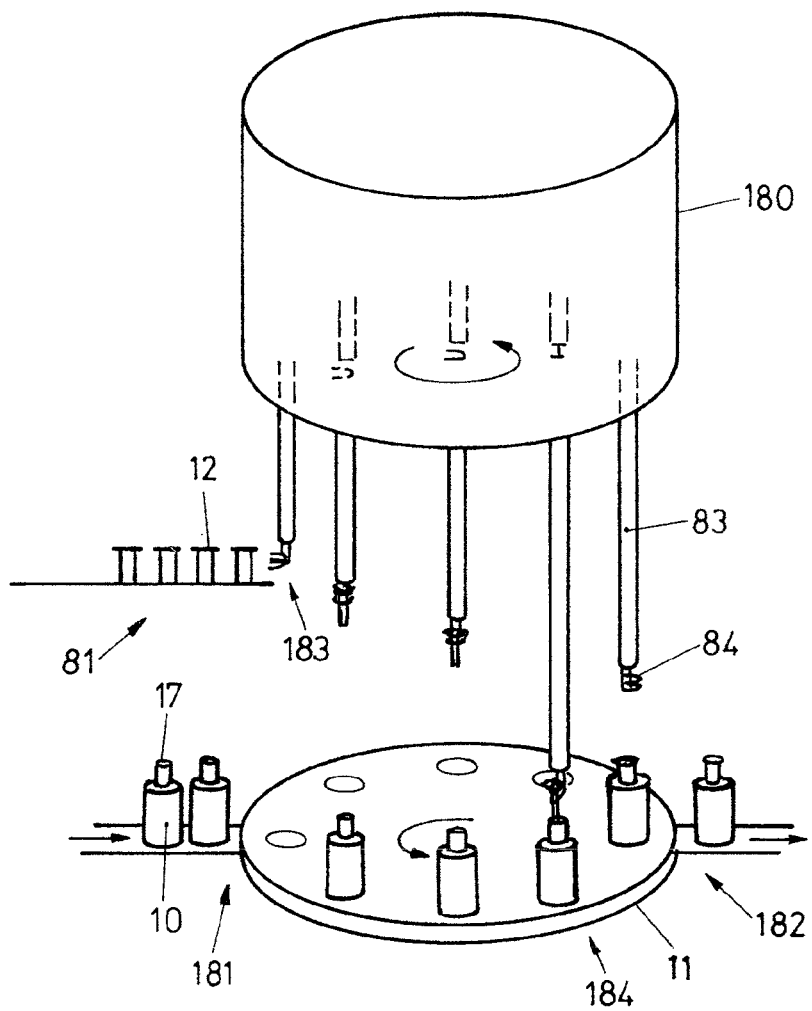
FIG. 20—schematically, a rotary variant of an apparatus for loading objects into cavities in holders according to the invention.

FIG. 20 shows schematically a practical example for loading flanged objects 12 such as glass syringes into holders 10 of the type illustrated in FIG. 18, utilising the loading scheme of FIGS. 2 and 8 and implemented with a rotary conveyor 11. Object input 81, such as a conveyor, presents objects 12 to the grippers 84 of object supports 83 provided on an object support rotor 180. Coaxial with the object support rotor 180 is rotary conveyor 11, and both object support rotor 180 and rotary conveyor 11 rotate synchronously with each other at the same angular velocity, either driven by a common drive or by two separate drives (not illustrated). Rotary conveyor 11 may be, as is common, a star gear or any other convenient known arrangement. Holders 10 are introduced onto rotary conveyor 11 at 181, e.g. by a conveyor, and leave rotary conveyor 11 at 182, again e.g. by a conveyor. As the rotary conveyor 11 and the object support rotor 180 rotate, objects 12 are collected at 183 and are gently lowered into the cavities 17 of the holders 10. At around position 184, at least the tip of the object 12 has already entered the cavity 17 in the corresponding object holder 10, and is released by the gripper 84 of the corresponding object support 83. If the object 12 has not been fully lowered into its cavity 17, it is allowed to fall a short distance, and to seat under the force of gravity. Subsequently, object holders 83 retract and travel further around the rotor to pick up another object 12. The loaded holders 10 then leave the rotary conveyor 11 at 182.

Figure 21:
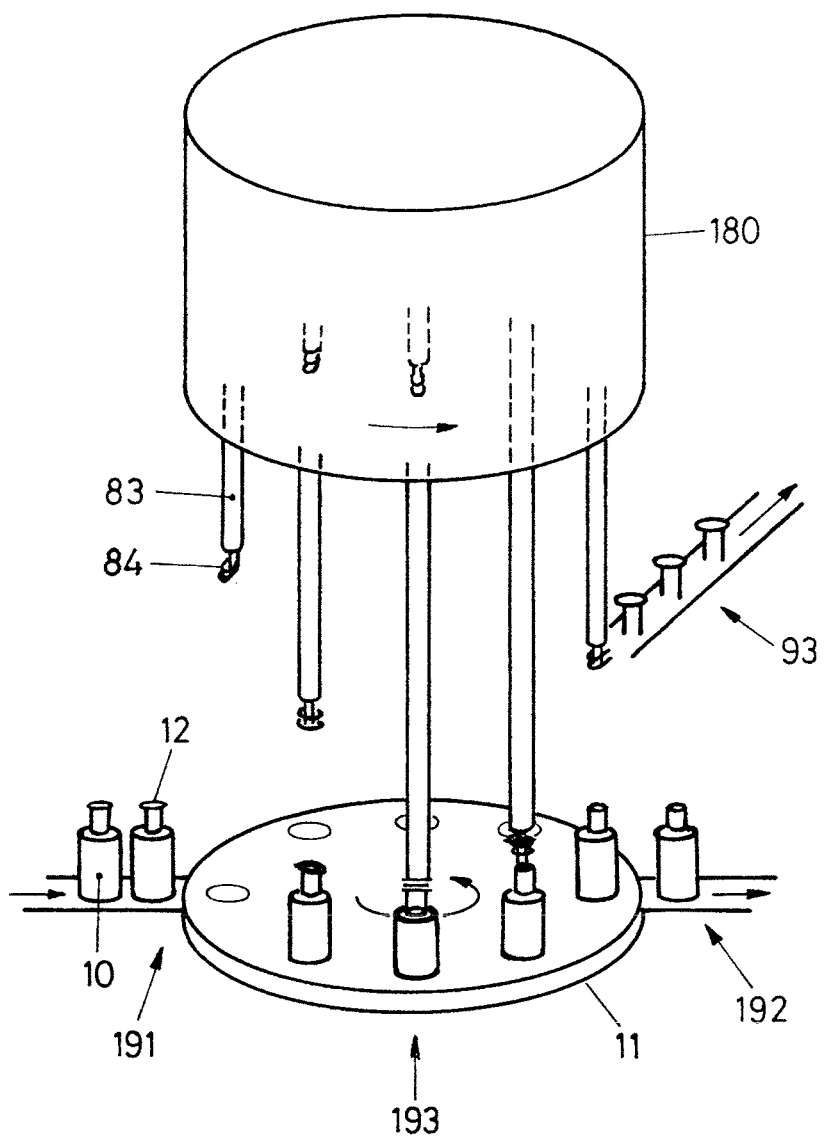
FIG. 21—schematically, a rotary variant of an apparatus for unloading objects from cavities in holders according to the invention.

As previously discussed, the extension and retraction of the object supports 83 may be controlled by one or more cams, pneumatically, by electric motors, or hydraulically, according to the desires of the process operator. These control systems are well-known to the skilled Artisan and need not be discussed further. Furthermore, the form of the grippers and the shape of the holders 10 may be adjusted as required for any given form of object 12: for instance, grippers 84 may be one or more suction cups, hooks etc. FIG. 21 illustrates schematically a rotary object unloading system analogous to the loading system of FIG. 20. Rotary conveyor 11 and object support rotor 180 are essentially the same as those in FIG. 20.

Loaded holders 10 enter the rotary conveyor 11 at 191 and are conveyed therearound. Object supports 83 extend and pick up objects 12 at point 193, and then subsequently retract with the object 12, which are deposited on object output 93, which is for instance a conveyor. Meanwhile, unloaded holders 10 exit the rotary conveyor at 192.

As previously discussed, the extension and retraction of the object supports 83 may be controlled by one or more cams, pneumatically, by electric motors, or hydraulically, according to the desires of the process operator. These control systems are well-known to the skilled Artisan and need not be discussed further. Furthermore, the form of the grippers and the shape of the holders 10 may be adjusted as required for any given form of object 12: for instance, grippers 84 may be one or more suction cups.

Figure 22:
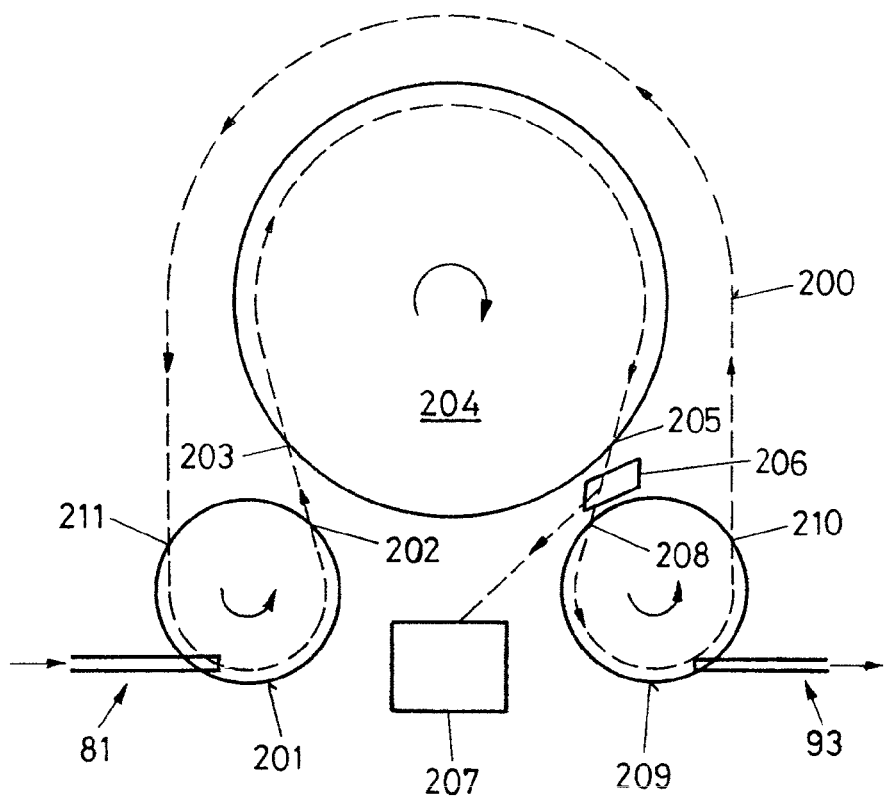
FIG. 22—schematically, a leak detection system incorporating loading and unloading apparatus according to the invention.

FIG. 22 illustrates schematically a container leak detection system incorporating an apparatus for loading objects into containers according to the invention, and an apparatus for unloading objects from containers according to the invention. The dashed line 200 illustrates the passage of holders through the system, and the objects are closed containers.

An apparatus for loading objects into cavities in holders (loading apparatus 201), which may be that as illustrated in FIG. 20, loads containers presented by an object input conveyor 81 into holders. The thus loaded holders exit loading apparatus 201 at loading apparatus output 202 and enter test cavities of the rotor 204 of a leak detection apparatus at test rotor input 203. As they travel around rotor 204, they are leak tested according to any known method, for instance (but not limited to) one or more of the methods disclosed in one or more of U.S. Pat. Nos. 5,907,093, 6,082,184, 6,202,477, 6,305,215, 6,439,033, 6,575,016, 6,829,936, WO 2011/012730, U.S. Pat. Nos. 7,000,456, 6,446,493 or 6,185,987, which are herein incorporated by reference insofar as they relate to leak testing, and after testing, the holders leave rotor 204 at test rotor output 205. Based on the result of leak testing, containers deemed to be leaking are rejected in their holders by rejection mechanism 206, and are transported to rejection output 207. Containers not deemed to be leaking then enter in their holders at unloading apparatus input 208 an apparatus for unloading objects from cavities in containers (unloading apparatus 209), which may be that illustrated in FIG. 21, where they are unloaded from the corresponding holders and/or output at object output 93. The thus unloaded holders then leave the unloading apparatus 209 at unloading apparatus output 210, and then travel around to re-enter loading apparatus 201 at loading apparatus input 211, to repeat the process.

Variations on the system illustrated in FIG. 22 are as follows: rejection mechanism 206 may be integrated into object output 93 so as to reject individual containers after unloading; the shape of the path 200 of the containers can be arranged at will; object loading apparatus 201 may be linear rather than rotary, as may object unloading apparatus 209 and leak detection apparatus.

Figure 23:
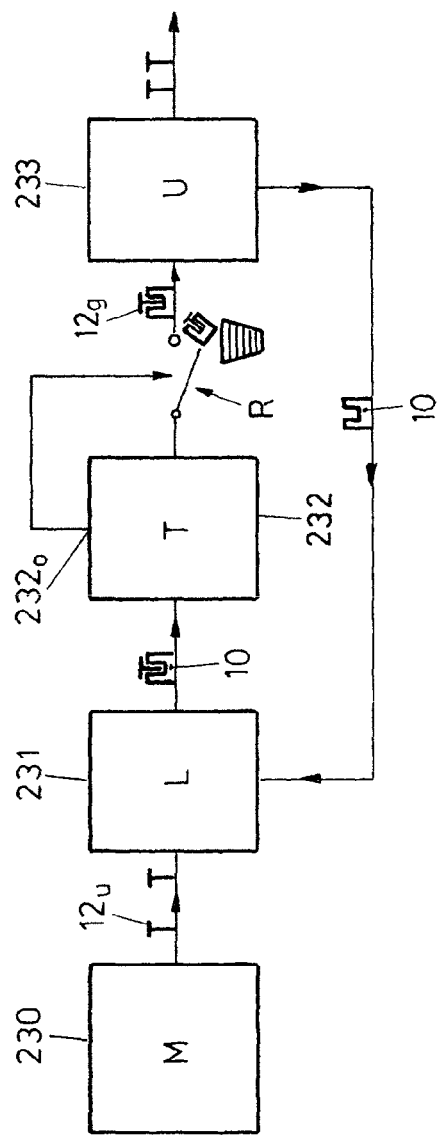
FIG. 23—schematically, an embodiment of a method of manufacturing unleaky containers according to the invention.

FIG. 23 illustrates schematically a method of manufacturing unleaky containers according to the invention.

Untested containers 12u are manufactured at 230 and are loaded into corresponding holders 10 according to one of the above-mentioned methods by one of the above-mentioned apparatuses in 231. In 232, the untested containers 12u are leak tested as discussed above, and rejection mechanism R rejects containers detected as leaking based on an output $232_o$ of the leak test. Subsequently, unleaky containers 12g are unloaded from their corresponding holders 10 at 233, and are output for further manufacturing, labelling, boxing, shipping, etc. Empty holders are returned to the loading block 231 such that they re-cycle through the system.

Figure 24:
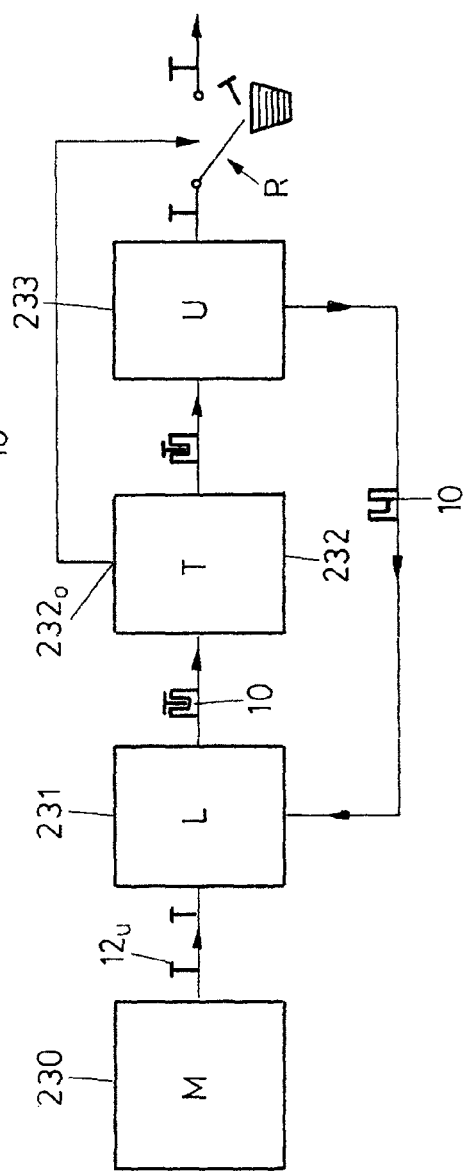
FIG. 24—schematically, a further embodiment of the method of manufacturing unleaky containers according to the invention.

FIG. 24 illustrates schematically a further method of manufacturing unleaky containers according to the invention, which differs from that of FIG. 23 in that the rejection mechanism R is situated after the unloading step 233. Thus all containers 12 are unloaded from the corresponding holders 10, after which rejection based on the output $232_o$ of the leak detection in 232 takes place. As above, empty holders are returned to the loading block 231 such that they cycle through the system.

While a full attempt has been made to describe the invention by means of various specific embodiments, these are not to be construed as limiting the scope of the invention, which is defined solely by the scope of the appended claims. In particular, it is noted that all embodiments may be combined as long as the result is not contradictory.

The invention claimed is:

1. Method of manufacturing closed, unleaky containers comprising:
    manufacturing closed, untested, containers;
    loading said containers into holders, said loading including:
        conveying holders along a holder path, each holder comprising at least one cavity for receiving a container loaded into the cavity in a loading-direction;
        transporting the containers along an object path extending to a loading area;
        configuring said object path and said holder path to mutually converge in a direction parallel to said loading-direction as distance along said object path to said loading area decreases,
        loading a container into a cavity in said loading area;
        transporting a plurality of containers simultaneously at different positions along said object path and conveying a plurality of holders simultaneously at different positions along said holder path;
    leak-testing said containers in a leak-detection step;
    rejecting containers determined as leaking in said leak-detection step together with their corresponding holder;
    unloading unrejected containers from said holders;
    accepting said unrejected containers as unleaky containers.

2. Method according to claim 1, wherein the object path is configured to approach the holder path in a direction parallel to said loading-direction as distance along said object path to said loading area decreases.

3. Method according to claim 2, wherein the position of the containers on the object path in a direction parallel to said loading-direction is controlled by at least one of: a cam arrangement, pneumatically, electric motors, hydraulically.

4. Method according to claim 1, wherein the holder path is configured to approach the object path in a direction parallel to said loading-direction as distance along said object path to said loading area decreases.

5. Method according to claim 4, wherein the position of the holders on the holder path in a direction parallel to the loading-direction is controlled by at least one of: a cam arrangement, pneumatically, electric motors, hydraulically.

6. Method according to claim 1, comprising first collecting containers sequentially from a collecting area upstream of said loading area.

7. Method according to claim 1, wherein at least one of said object path and said holder path is at least one of: linear, curved, rotary.

8. Method according to claim 1 wherein the containers are dropped a non-vanishing specified distance from their respective cavities into their respective cavities.

9. Method according to claim 8, wherein the containers are dropped onto a shock-absorbing member.

10. Method according to claim 1, wherein at least a part of said holders comprise more than one of said cavities, comprising depositing more than one of said containers into said more than one cavities of said holder.

11. Method according to claim 1, wherein at least one of said transporting and said conveying is carried out continuously.

12. Method according to claim 11, wherein said transporting and said conveying are mutually synchronous.

13. Method according to claim 1, wherein respective containers along the object path travel in said loading area at a velocity in a plane perpendicular to the loading-direction substantially equal to the velocity of the respective holders on the holder path in said loading area.

14. Method of manufacturing closed, unleaky containers comprising:
    manufacturing closed, untested, containers;
    loading said containers into holders, said loading including
        conveying holders along a holder path, each holder comprising at least one cavity for receiving a container loaded into the cavity in a loading-direction;
        transporting the containers along an object path extending to a loading area;
        configuring said object path and said holder path to mutually converge in a direction parallel to said loading-direction as distance along said object path to said loading area decreases;
        loading a container into a cavity in said loading area;
        transporting a plurality of containers simultaneously at different positions along said object path and conveying a plurality of holders simultaneously at different positions along said holder path;
    leak-testing said containers in a leak-detection step;
    unloading said containers from said holders;
    rejecting containers determined as leaking in said leak-detection step;
    accepting unrejected containers as unleaky containers.

15. Apparatus for leak-testing containers comprising:
    an apparatus for loading objects into cavities in holders; comprising
        at least one holder conveyor defining a holder path for conveying holders to, through, and from a loading area, each holder having at least one cavity and each cavity having a loading-direction;
        a transport arrangement for transporting containers into cavities in said holder on the at least one holder conveyor in said loading-direction in the loading area, and comprising a plurality of moveable releasable object supports, positions of the object supports defining an object path for transporting containers into cavities in holders on the at least one holder conveyor, said object path and said holder conveyor being configured to mutually approach in a direction parallel to said loading-direction at decreasing distance to the loading area;
    a leak testing apparatus situated downstream of the apparatus for loading objects into cavities in holders;
    an apparatus for unloading objects from holders situated downstream of the leak testing apparatus;
    a rejection mechanism for rejecting containers determined as leaking by the leak testing apparatus and operated based on an output thereof, said rejection mechanism being situated either between the leak testing apparatus and the apparatus for unloading objects from holders, or being situated downstream of the apparatus for unloading objects from holders;

a container input for providing containers as objects to, the apparatus for loading objects into in cavities in holders;

a container output for receiving containers from the apparatus for unloading objects from cavities in holders in turn;

a holder conveyor for conveying holders to, through, and from each of the apparatus for loading objects into cavities in cavities in holders, the leak detection apparatus, and the apparatus for unloading objects from holders in turn.

16. Apparatus according to claim 15, wherein the object supports are movable at least parallel and perpendicular to the loading-direction, and wherein the object path is configured to approach the at least one holder conveyor at decreasing distance to the loading area.

17. Apparatus according to claim 16, wherein the position of the object supports is controlled at least partially by at least one of: a cam arrangement, hydraulically, pneumatically, by electric motors.

18. Apparatus according to claim 15, wherein the object supports are movable at least perpendicular to the loading direction, and wherein the conveyor is configured to approach the at least one object path in a direction parallel to the loading-direction at decreasing distance to the loading area.

19. Apparatus according to claim 18, wherein the position of the holders is at least partially defined by at least one of: a cam, hydraulically, pneumatically, and electric motors.

20. Apparatus according to claim 15, further comprising at least one object input for containers which defines a collecting area, said collecting area being situated upstream of the loading area.

21. Apparatus according to claim 20, wherein each holder comprises more than one of said cavities, and wherein the transport arrangement is arranged to collect a corresponding quantity of containers from the object input and deposit these containers in each of said plurality of cavities in a respective holder.

22. Apparatus according to claim 15, wherein the at least one of the holder conveyor and the transport arrangement are at least one of: linear, curved, rotary.

23. Apparatus according to claim 15, wherein each holder comprises a shock-absorbing member of a soft material selected from the group consisting of nylon, silicone rubber, and natural rubber.

24. Apparatus according to claim 23, wherein the shock-absorbing member is situated at the open end of the cavity, forming an extension thereof and being arranged to interact with an abutment, in the form of a flange of a container.

25. Apparatus according to claim 15, wherein each holder is provided with more than one of said cavities, and wherein the transport arrangement is arranged to deposit containers sequentially or simultaneously into each of said plurality of cavities in a respective holder.

26. Apparatus according to claim 15, wherein the releasable object supports comprise suction cups or grippers opening parallel or perpendicular to the insertion direction.

27. Apparatus according to claim 15, wherein the transport arrangement is arranged to transport respective containers opposite respective holders and synchronously therewith.

28. Apparatus according to claim 15, wherein the holder conveyor is an endless conveyor.

29. Apparatus according to claim 15, wherein the apparatus for loading objects and the apparatus for unloading objects both comprise a rotary holder conveyor and a rotary transport arrangement.

* * * * *